Patented Nov. 14, 1950

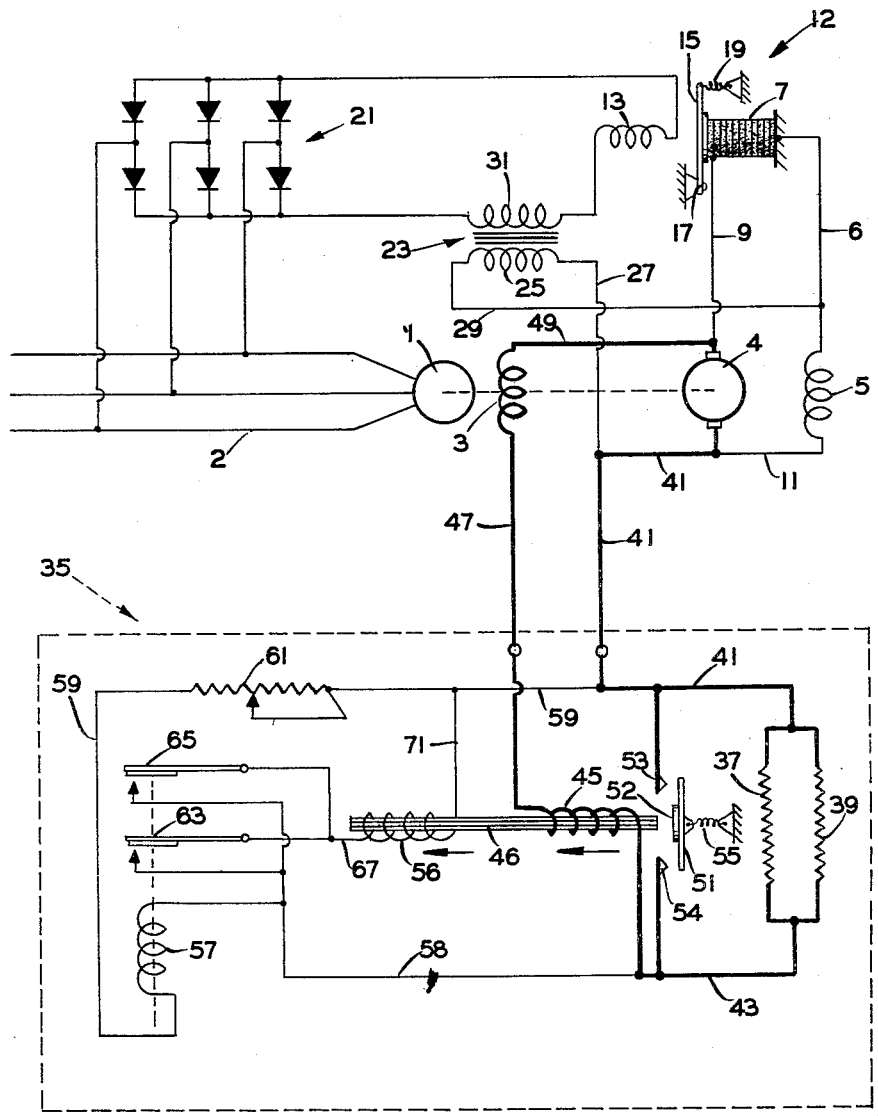

2,529,766

UNITED STATES PATENT OFFICE 2,529,766

EXCITER CONTROL

Lawrence E. Gartner, Hasbrouck Heights, and Joseph W. Allen, Montclair, N. J., assignors to Bendix Aviation Corporation, Teterboro, N. J., a corporation of Delaware Application October 29, 1948, Serial No. 57,254

7 Claims. (Cl. 322—24)

Our present invention relates to electrical regulating systems and more particularly to improvements in an exciter control the function of which is to automatically insert and remove a fixed value of resistance in the field of an alternator.

In the case of a wide speed range of alternator with directly coupled exciter, the alternator may approach possible maintenance of a no-load A. C. output voltage on residual flux alone at high operating speeds. When the exciter control of the present invention is not provided, a carbon pile regulator for the exciter field may, in an effort to meet such conditions, commence to chatter and buzz.

An object of the present invention, therefore, is to provide a main resistor which may be connected in series with the alternator field and in turn across the exciter armature under low load high speed conditions and under conditions that the carbon pile regulator would otherwise tend to chatter or buzz in its effort to reduce the energization of the exciter field.

Another object of the invention is to provide a novel shunt control circuit, including a shunt contacting coil and pilot relay connected across the main resistor and arranged to control an auxiliary shunt winding which aids a series winding of a main contactor so as to insert the main resistor in series with the alternator field under low load high speed conditions, while under fully loaded conditions or at minimum speeds of the alternator the resistor may be shunted out of operation.

The above and other objects and features of the invention will appear more fully hereinafter from a consideration of the following description taken in connection with the accompanying drawing where one embodiment of the invention is illustrated by way of example. In the drawing, there is illustrated diagrammatically an embodiment of our invention.

Referring now to the drawing, there is shown an alternating current generator or alternator 1 which is connected to supply power to an external load circuit through conductors 2. Alternator 1 is provided with a field winding 3 which is energized by exciter 4 having a shunt field winding 5. Connected in series with the field winding 5 of the exciter 4 by a conductor 6 is a variable resistance carbon pile element 7. The resistance element 7 is connected at its opposite end by a conductor 9 to an output terminal of the exciter 4. The opposite output terminal of the exciter 4 is connected by a conductor 11 to the exciter field winding 5.

Thus, the excitation of the exciter field winding 5 is controlled by the variable resistance carbon pile element 7. The variable resistance carbon pile element 7 may be embodied in a regulator 12 of a type such as shown in U. S. Patent No. 2,427,805, granted September 23, 1947, to W. G. Neild and assigned to Bendix Aviation Corporation.

The regulator 12 may include a main control winding 13 arranged to control an armature 15 shown diagrammatically herein as pivoted at 17 and exerting a compressive force upon the carbon pile 7 under tension of a spring 19. The spring 19 is arranged so as to balance the pull on the armature by the electromagnetic winding 13 when energized by a line voltage having a predetermined value, as described in greater detail in the aforenoted patent.

Interposed between alternator output 2 and the main control coil 13 is a full wave rectifier 21 which may be of any suitable type such as the well known copper oxide variety.

For preventing hunting of the above described regulating system, there may be provided an anti-hunting system of a type disclosed and claimed in U. S. Patent No. 2,211,612, granted August 13, 1940, to L. W. Thompson and assigned to General Electric Company.

The latter system may include a transformer comprising a core 23 having a primary winding 25 connected so as to have its energization varied in accordance with the operation of the regulator 7 and, as shown, it is connected across the terminals of the field winding 5 of the exciter 4 through conductors 27 and 29.

Also wound on the core 23 is a secondary winding 31 which is connected so as to apply a transient corrective or anti-hunting bias to the control coil 13. As shown, the secondary winding 31 is connected in series with the main control coil 13 on the output or direct current side of the rectifier 21.

The operation of the above noted anti-hunting system is described in greater detail in the U. S. Patent No. 2,211,612 and the anti-hunting system does not form a part of the present invention.

The subject matter of the present invention relates to an exciter control indicated generally by the numeral 35 and including resistor elements 37 and 39 connected at one end by a conductor 41 to an output terminal of the exciter 4, while the opposite end of the resistance elements 37 and 39 are connected by a conductor 43 to one end of a main control electromagnetic winding 45 wound on a magnetic core 46. The opposite end of the winding 45 is connected by a conductor 47 to the alternator field winding 3 which is in turn connected at the opposite end through conductor 49 to the other output terminal of the exciter 4.

It will be seen then that when the resistor elements 37 and 39 are inserted between output conductor 41 of the exciter 4 and the field winding 3 of the alternator 1, energization of the alternator field 3 is materially reduced.

A main control switch 51 having an armature 52 cooperating with the core 46 is arranged to shunt the resistance elements 37 and 39 out of operation upon closing contacts 53 and 54 connected to conductors 41 and 43 respectively. The latter main control switch 51 is normally biased to an open position by a spring 55 and is biased to a closed position by the combined electromagnetic forces of the main control winding 45 and an auxiliary winding 56 acting on armature 52.

The ampere turns of the windings 45 and 56 act in additive relation. Energization of the auxiliary winding 56 is controlled by a pilot relay winding 57 connected by conductors 58 and 59 across the resistor elements 37 and 39.

Connected in the conductor 59 is a swamping resistor 61 which may be so adjusted that the closing of the main switch 51 controlled by the pilot relay winding 57 is set to the desired closing current and hence voltage value. The pilot relay 57 operates relay switch elements 63 and 65 to control energization of the auxiliary winding 56 by shunting auxiliary winding 56, at the predetermined voltage, across resistors 37 and 39 through conductors 43 and 58, switch arms 63 and 65, conductor 67, auxiliary winding 56 and conductors 71, 59 and 41.

Thus, upon the closing of switch elements 63 and 65, the auxiliary winding 56 is energized by the drop across the main resistors 37 and 39 so as to cause with the main control winding 45 the closing of the main contactor 51. On the closing of the main control switch 51, the main resistors 37 and 39 are shorted out, reducing the voltage drop across the resistors 37 and 39 to substantially zero.

With the zero voltage, the pilot relay 57 permits switch arms 63 and 65 to be biased under inherent spring tension in a direction to open the circuit of the auxiliary winding 56 of the main contactor. The main contactor 51, however, remains closed by virtue of the ampere turns of the series winding 45 which is sufficient to maintain the main contactor 51 closed due to the shunting of resistors 37 and 39 and the decrease in the air gap between the core 46 and armature 52. However, as the current in the alternator field 3 drops, the main contactor 51 controlled by the winding 45 will open at a current value governed by the ampere turns of the series winding 45 and adjustment of the biasing spring 55.

Upon the opening of contactor 51 resistors 37 and 39 are again inserted in the field winding 3 of the alternator 1.

As such, the differential between closing and drop out of the main contactor 51 is a controllable function of the current in the field winding 3 of the alternator. When installed in a complete system, operation is as follows: at the minimum speed of the alternator 1 the main contactor 51 remains closed for all load conditions. At higher operating speeds and under lightly loaded conditions, the main contactor 51 opens and inserts the main resistance in the alternating field 3. For fully loaded conditions the contactor 51 necessarily remains closed at all speeds.

Thus, upon the current to the field winding 3 exceeding a predetermined minimum value set by the adjustment of the swamping resistor 61, the resistors 37 and 39 are shunted out of the circuit of the field winding 3 by the closing of main switch 51 and regulation of the alternator output is effected through carbon pile regulator 12. However, when the current to the field winding 3 falls below a predetermined minimum the series winding 45 permits switch 51 to open under tension of the spring 55 inserting the resistors 37 and 39 into the circuit of the field winding 3 so that regulation of the output of the alternator may continue to be effected by the regulator 12 without tending to buzz or chatter.

Although only one embodiment of the invention has been illustrated and described, various changes in the form and relative arrangements of the parts may be made to suit requirements.

What is claimed is:

1. In a control system, the combination with a generator having a field magnet winding, means for regulating the energization of said field winding, and a resistor in circuit with said winding, of a relay switch means for closing a shunt circuit for said resistor when the voltage drop across said resistor exceeds a predetermined value, said relay switch means including an auxiliary winding connectable across said resistor and a main winding connected in series relation between said resistor and field magnet winding.

2. The combination defined by claim 1 including a pilot relay switch controlling said auxiliary winding, a winding connected across said resistor and effective for closing said pilot relay switch to cause energization of said auxiliary winding and the shunting of said resistor as a function of the current flow in said field winding.

3. For use with a generator having a field winding and means for regulating the energization of said field winding; the combination comprising resistor means for connection in circuit with said field winding and regulating means, relay switch means for closing a shunt circuit for said resistor means, means to effect the closure of said relay switch means upon the voltage drop across said resistor means exceeding a predetermined value, and means to operate said relay switch means to an open position as a controllable function of the current in the field winding of said generator so as to cause insertion of said resistor means in said field winding circuit upon the current in said circuit decreasing below a predetermined value.

4. The combination defined by claim 3 in which said closure effecting means includes a pilot relay means having a control winding connected in shunt with said resistor means, and a variable resistor element for setting the predetermined voltage value to effect closure of said relay switch means.

5. The combination defined by claim 3 in which said closure effecting means includes a pilot relay means, a variable resistor element for setting the predetermined voltage value to effect closure of said relay switch means, and means including said relay switch means, whereby said pilot relay means is shunted out of operation upon closure of said shunt circuit.

6. For use with a variable speed generator having a field winding and means for regulating the energization of said field winding; the combination comprising resistor means for connection in circuit with said field winding, a main relay switch for closing a shunt circuit for said resistor means, a main control winding connected in series between said resistor means and said field winding, an auxiliary winding, a pilot relay switch for connecting said auxiliary winding across said resistor means, a pilot relay winding connected across said resistor means through a variable resistance element, said pilot relay winding controlling said pilot relay switch to effect energization of said auxiliary winding as a controllable function of the current in the field winding, said auxiliary winding and said main winding acting to bias said main relay switch to a position to close said shunt circuit upon energization of the auxiliary winding.

7. The combination defined by claim 6 in which the closing of said shunt circuit effects de-energization of said pilot relay winding and said auxiliary winding, and spring means biasing said main relay switch to an open position under high speed, lightly loaded conditions of said generator.

LAWRENCE E. GARTNER.
JOSEPH W. ALLEN.

REFERENCES CITED

The following references are of record in the file of this patent:

UNITED STATES PATENTS

| Number | Name | Date |
|---|---|---|
| 2,453,065 | Creveling | Nov. 2, 1948 |